United States Patent [19]

Burkett

[11] Patent Number: 4,653,243

[45] Date of Patent: Mar. 31, 1987

[54] METHOD AND COMPOSITION FOR COATING CEMENT BASED CONSTRUCTION SURFACES

[76] Inventor: Donald L. Burkett, 1501 Skipper Rd., Lutz, Fla. 33549

[21] Appl. No.: 691,929

[22] Filed: Feb. 25, 1985

[51] Int. Cl.⁴ .................. B05D 5/00; B32B 3/06; E04B 1/00; E04C 1/00
[52] U.S. Cl. .................. 52/741; 52/309.8; 427/244; 524/5; 428/306.6
[58] Field of Search .............. 427/393.6, 397.8, 397.7, 427/244; 524/5; 52/309.8, 741, 743; 428/306.6

[56] References Cited

FOREIGN PATENT DOCUMENTS

| 0004931 | 1/1979 | Japan | 524/5 |
| 6106970 | 8/1981 | Japan | 524/5 |
| 0067061 | 4/1982 | Japan | 524/5 |

Primary Examiner—Michael R. Lusignan
Attorney, Agent, or Firm—Arthur W. Fisher, III

[57] ABSTRACT

A method and composition for coating cement based construction surfaces wherein the composition comprises the application of a cementitious material containing an ethylene vinyl acetate binder and an aluminum silicate and glass fiber to the construction surface in a single application.

3 Claims, 1 Drawing Figure

U.S. Patent  Mar. 31, 1987  4,653,243
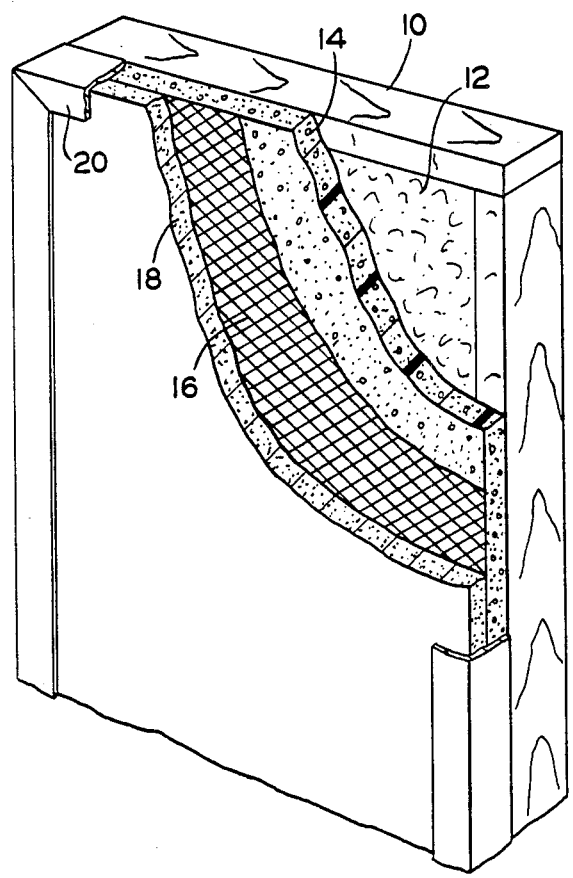

METHOD AND COMPOSITION FOR COATING CEMENT BASED CONSTRUCTION SURFACES

BACKGROUND OF THE INVENTION

1. Field of the Invention

A method and composition for coating construction surfaces with a single application of a cementitious material containing an admixture.

2. Description of the Prior Art

Various efforts have been undertaken to coat masonry construction. Such efforts have included coating masonry building blocks, such as those made from cinders, slag, cement, haydite, clay, or the like, to produce an adherent and preferably dense, hard coating on at least one surface thereof.

Masonry construction is generally porous. Unfortunately, masonry construction most economically produced is the most porous and presents the greatest difficulty in applying a water-resistant or impervious finish. For example, a wall of cinder blocks has a very rough porous surface which is extremely difficult to paint or coat to produce a smooth, attractive surface. Liquid coating agents are generally difficult to apply to such a surface, thus becoming somewhat dissipated, and do not readily cover the pores to seal surface imperfections in the blocks.

Additional efforts to provide compositions useful as low-cost, thermal insulating building material have been made. Such materials generally include binders comprising cement admixed with a lightweight inorganic aggregate such as vermiculite or perlite. Unfortunately, these materials are usually porous and absorb water from the ambient atmosphere. Under temperature conditions, the deterioration in the physical properties of these materials is dramatic and substantially diminishes their usefulness. Attempts to avoid the water susceptibility includes various cements with the silicates of potassium or sodium.

Additional examples of the prior art may be found in U.S. Pat. Nos. 2,814,836; 3,302,362; 3,336,179; 3,854,987; 4,109,032; 4,184,992; 4,198,472; 4,373,813; 4,423,096 and 4,444,595.

SUMMARY OF THE INVENTION

The present invention relates to a composition applied to a typical wall structure. The wall structure comprises a frame to retain insulation therein having a foam base and galvanized lath attached to the outer surface thereof to receive the composition of the instant invention.

The coating composition of the instant invention is added to a mixture of water and cement. Sand is then added and mixed. The coating composition comprises an ethylene vinyl acetate binder with aluminum silicate and glass fiber. In hot weather applications, cellulosic retarder is added.

The advantages of this unique structure are significant. For example, existing coatings require three (3) coats forming a ¾ to ⅞ inch thickness applied over 48 to 96 hours. In contrast to the unique invention described herein is applied a single coat requiring only a ⅜ to ½ inch thickness.

The physical characteristics of the instant invention exhibit resistance to cracking resulting from structural settling and thermal shock due to extreme heat and cold fluxuations substantially enhancing water resistance.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

The figure is a schematic cross section view of the composition of the present invention applied to a typical wall structure.

Similar reference characters refer to similar parts throughout the several view of the drawings.

DETAILED DESCRIPTION OF THE PREFERRED EMBODIMENT

FIG. 1 is a schematic cross sectional view of the composition of the present invention applied to a typical wall structure. The wall structure comprises a frame 10 to retain insulation 12 therein having a foam base 14 and galvanized lath 16 attached to the outer surface thereof to receive the composition 18 of the instant invention within a form trim 20.

The coating composition comprises an ethylene vinyl acetate binder of 2.42 pounds, 6 pounds of aluminum silicate and 3 pounds of glass fiber. The glass fibers are approximately 0.25 inches long and 0.004 inches thick. Approximately 12 pounds of the coating composition of the instant invention is added to approximately 6 gallons of water placed in a mixing bin or container into which 94 pounds of cement has been added. Approximately 260–270 pounds of the sand is then added and mixed for approximately 5 to 7 minutes. In hot weather applications, 1 ounce of cellulosic retarder is added.

The advantages of this unique structure are significant. For example, existing coatings require 3 coats forming a ¾ to ⅞ inch thickness. There is a scratch or bed coating requiring a 24 to 48 hours drying period followed by leveling coating requiring an additional 24 to 48 hours curing time. Then a finishing texture is applied. In contrast to the unique invention described herein is applied in a single coat requiring only a ⅜ to ½ inch thickness.

The physical characteristics of the instant invention exhibit resistance to cracking resulting from structural settling and thermal shock due to extreme heat and cold fluxuations substantially enhancing water resistance.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method of constructing a wall structure comprising:

(a) erecting a frame, (b) securing insulation in said frame,
(c) covering said insulation with a foam base,
(d) positioning a lath over the outer surface of said foam base and
(e) coating said foam base with a composition of ethylene vinyl acetate binder, aluminum silicate and glass binder in a relative ratio by weight of 7.5 to 18 to 9.

2. The method of claim 1 wherein said composition further includes water, cement and sand, the relative ratio by weight of ethylene vinyl acetate/aluminum silicate/glass fiber to cement to sand being 1 to 8 to 20.

3. The method of claim 1 wherein the length to thickness ratio of said glass fiber is substantially 60 to 1, the length and thickness of said glass fiber is substantially 0.25 inches and 0.004 inches respectively.

* * * * *